Feb. 27, 1945.  W. A. HYLAND  2,370,468
STEERING HITCH MECHANISM
Filed Dec. 26, 1942
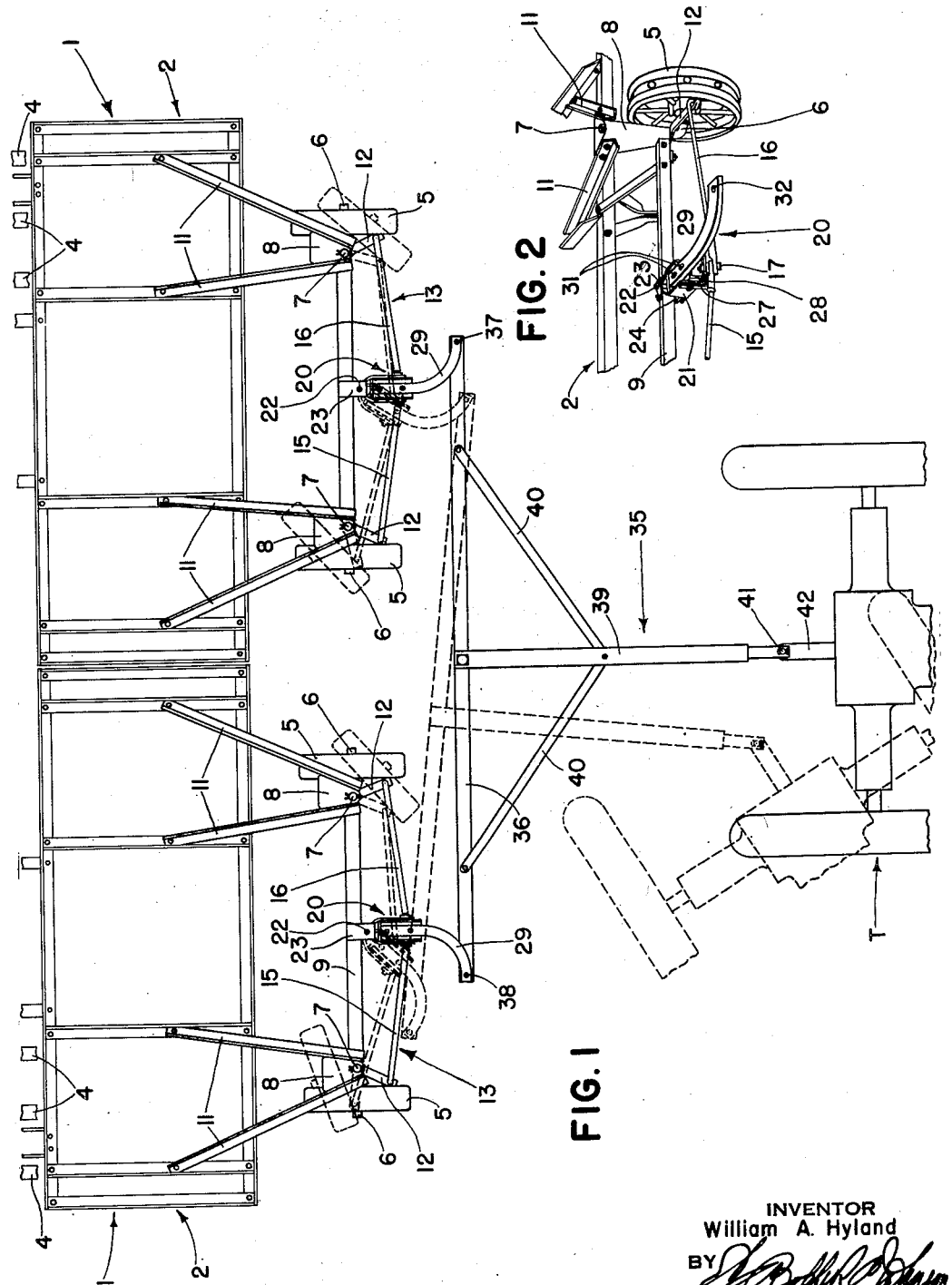
INVENTOR
William A. Hyland
BY
ATTORNEYS Patented Feb. 27, 1945

2,370,468

UNITED STATES PATENT OFFICE 2,370,468

STEERING HITCH MECHANISM

William A. Hyland, Horicon, Wis., assignor to The Van Brunt Manufacturing Company, Horicon, Wis., a corporation of Wisconsin Application December 26, 1942, Serial No. 470,289

2 Claims. (Cl. 280—33.55)

The present invention relates generally to agricultural implements and more particularly to steering and propelling means for a pair of implements, such as grain drills, which it is desired to hitch and propel in side-by-side relation.

The object and general nature of the present invention is the provision of new and improved steering mechanism for a pair of grain drills or the like in which the steering and directional control of the two interconnected implements may be performed with ease and dispatch. More particularly, it is a feature of this invention to provide a combined steering and draft transmitting connection between the propelling agency, preferably but not necessarily a tractor, and the two implements which is so constructed and arranged that the steering wheels on the implement at the inside of the turn are swung through a greater angle than the steering wheels of the implement at the outside of the turn, whereby all of the steering wheels move generally about the center of the turn.

These and other objects and advantages of the present invention will be apparent to those skilled in the art after a consideration of the following detailed description, taken in conjunction with the accompanying drawing in which the preferred form of the invention has been illustrated.

In the drawing:

Figure 1 is a plan view of an outfit in which the principles of the present invention have been incorporated, including a pair of grain drills hitched in side-by-side relation and propelled by a farm tractor of well-known construction; and Figure 2 is a fragmentary perspective view showing the main steering arm for the left-hand implement.

Referring now to the drawing, a pair of grain drills, each indicated by the reference numeral 1, are hitched in side-by-side relation, each grain drill including a frame 2 supported on rear press wheels 4 and a pair of front steerable wheels 5. Each front wheel 5 is mounted on a wheel-receiving section 6 which is carried at the lower end of a vertical spindle 7 received in journal sleeve members 8 that are fixed at the opposite ends of a front truck axle 9. The latter is rigidly connected to the grain drill frame 2 by bars 11. To each of the steering spindles 7 is fixed a steering arm 12, and each pair of steering arms 12 are, according to the Ackerman principle, arranged in forwardly divergent lines and connected together at their outer ends by drag link means, indicated in its entirety by the reference numeral 13 and which in the present instance includes a pair of drag link sections 15 and 16 pivoted, respectively, at their outer ends to the associated steering arms 12 and pivoted, as by a bolt 17 (Figure 2), to a main steering arm indicated in its entirety by the reference numeral 20, whereby the wheel 5 at the inside of the turn is swung through a greater angle than the wheel at the outside of the turn and the axis of each wheel extends generally through the center of turn.

Coming now to the feature with which the present invention is more particularly concerned, each of the main steering arms 20 comprises a yoke 21 which is connected by a pivot bolt 22 to upper and lower brackets 23 and 24 fixed to the front truck axle 9. The member 21 is thus swingable about a vertical axis defined by the pivot bolt 22. A bracket 27 is fixed to the forward end of the yoke 21 and receives the pivot bolt 17 to which the drag link sections 15 and 16 are connected, as described above. A second bracket 28 is fixed to the yoke member 21 and serves as a support rigid therewith which receives the rear end of a curved arm 29 secured to the support 28 by bolts 31. The forward or outer end of the curved arm 29 is apertured as at 32. Each of the main steering arms 20, each of the grain drills 1 having such an arm, is of like construction, and hence further description is unnecessary.

The propelling agency is preferably a tractor, indicated in its entirety by the reference character T, and the combined steering and draft transmitting hitch is indicated in its entirety by the reference numeral 35. The hitch unit 35 comprises a transverse member 36 which is rigid and which is connected by pivot members 37 and 38 to the left and right hand main steering arms 20, the pivots 37 and 38 being disposed in the openings 32 in the curved arm 29. A longitudinal member 39 is connected at its rear end to the rigid cross member 36 and is reenforced by braces 40. The member 36 thus serves as drag link means connecting the main steering arms 20. The forward end of the hitch member 39 is connected by a pin 41 to the drawbar 42 of the tractor.

The operation of the steering hitch mechanism of the present invention is substantially as follows:

It will be seen from Figure 1 that the steering arms 20 are, by virtue of the curved arm sections 29, arranged in forwardly divergent lines, somewhat like the arrangement of the steering arms 12 of each front truck. Thus, when the tractor is turned to the right, as indicated in dotted lines, not only is the propelling draft transmitted to the two grain drills 1 through the hitch connection 35 but, in addition, the steering arms 20 are swung about their pivotal connection, as at 22, with the front truck axles, and since the arms 20 are arranged in forwardly divergent relation, the arm 20 at the inside of the turn, as shown in dotted lines, is swung through a greater angle than the arm at the outside of the turn. This results in turning the two steerable front truck wheels at the inside of the turn through a greater angle than the two steerable front trucks of the implement at the outside of the turn. In other words, the relationship between the two front trucks of the two implements hitched side-by-side is, when turning, approximately the same as the relation between the two steerable wheels of each truck. As a result of this construction, all of the four steerable wheels of the interconnected implements are swung into a position so that their axes extended pass generally through or adjacent the center of the turn. In order to maintain the implements in the desired contacting side-by-side arrangement, suitable connecting means may be bolted or otherwise connected to the frames 2 or other parts of the drills.

While I have shown and described above the preferred construction in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A multiple grain drill hitch for drawing a plurality of grain drills arranged in side by side relation, each having a front truck and each truck having a pair of steerable wheels connected together, an arm connected with each truck to steer the wheels thereof, said arms extending forwardly in diverging relation, a transverse bar pivoted at its ends to the forwardly divergent ends of said arms, a forwardly extending draft link connected at its rear end to said transverse bar, and means fixing said forwardly extending draft link rigidly to said transverse bar.

2. A multiple hitch for a pair of implements, each having a front axle, a pair of steerable wheels pivoted to the ends thereof, and steering arms connected to swing said wheels and normally disposed in forwardly divergent relation, said hitch comprising a hitch arm pivoted for lateral swinging to each of said front axles, a pair of drag links extending in opposite directions from each hitch arm to the associated steering arms, said hitch arms extending forwardly from said front axles in divergent relation, and a rigid cross member pivoted to the forward ends of said hitch arms.

WILLIAM A. HYLAND.